(12) United States Patent
Ruat et al.

(10) Patent No.: US 7,502,388 B2
(45) Date of Patent: Mar. 10, 2009

(54) HOT SYNCHRONIZATION DEVICE OF AN ASYNCHRONOUS FRAME RECEIVER

(75) Inventors: Ludovic Ruat, Saint Savourin (FR); Paul Kinowski, Aix-en-Provence (FR); Alexander Czajor, Bouc Bel Air (FR)

(73) Assignee: STMicroelectronics SA, Montrouge (FR)

( * ) Notice: Subject to any disclaimer, the term of this patent is extended or adjusted under 35 U.S.C. 154(b) by 929 days.

(21) Appl. No.: 10/824,938

(22) Filed: Apr. 15, 2004

(65) Prior Publication Data
US 2004/0252704 A1 Dec. 16, 2004

Related U.S. Application Data

(63) Continuation of application No. PCT/FR02/03476, filed on Oct. 11, 2002.

(30) Foreign Application Priority Data
Oct. 15, 2001 (FR) .................. 01 13268

(51) Int. Cl.
*H04J 3/06* (2006.01)
(52) U.S. Cl. .................................... 370/509
(58) Field of Classification Search ............. 370/395.2, 370/395.1, 389, 238.1, 395.62, 503–520
See application file for complete search history.

(56) References Cited

U.S. PATENT DOCUMENTS

| | | | | |
|---|---|---|---|---|
| 6,067,547 A | * | 5/2000 | Douceur | 707/100 |
| 6,131,134 A | | 10/2000 | Huang et al. | 710/103 |
| 2001/0024474 A1 | * | 9/2001 | Rakib et al. | 375/259 |

FOREIGN PATENT DOCUMENTS

EP 1134666 9/2001

* cited by examiner

*Primary Examiner*—Chirag G Shah
*Assistant Examiner*—Ramtin Kangarloo
(74) *Attorney, Agent, or Firm*—Lisa K. Jorgenson; Allen, Dyer, Doppelt, Milbrath & Gilchrist, P.A.

(57) ABSTRACT

An asynchronous frame receiver includes an input for receiving an asynchronous frame comprising a break character, which includes a determined number of bits having a same value. A hot-plugging circuit for connecting to an asynchronous data bus that is operating by detecting the break character, and leaving an initial idle state and switching to at least one operating mode when the break character has been detected.

17 Claims, 3 Drawing Sheets

HOT SYNCHRONIZATION DEVICE OF AN ASYNCHRONOUS FRAME RECEIVER

RELATED APPLICATION

The present application is a continuation of International Application No. PCT/FR02/03476 filed on Oct. 11, 2002, the entire disclosure of which is incorporated herein by reference.

FIELD OF THE INVENTION

The present invention relates to asynchronous data transmission circuits, generally called universal asynchronous receiver transceivers (UARTs), that are used to establish multipoint connections between a master device and slave devices via an asynchronous data bus. The present invention relates more particularly to a slave-type asynchronous frame receiver, and a synchronization device for the asynchronous frame receiver.

BACKGROUND OF THE INVENTION

The data conveyed by an asynchronous frame are generally in the form of 10-bit characters, each comprising an 8-data bit chain preceded by a start bit and followed by a stop bit. These two framing bits always have opposite values, either 0 and 1 or 1 and 0. It follows that a data character cannot comprise a string of 10 bits of the same value. Two successive frames can therefore be separated by an idle interval during which a word comprising 10 bits of the same value, for example 1 bit, is generated.

When a UART circuit attempts to hot plug onto an asynchronous data bus and it is not synchronized with the bus, it must detect the idle interval before detecting the start bit of the first character received.

Furthermore, in asynchronous data transmissions, the receiver does not receive the transmitter's clock signal. The respective clocks of the transmitter and the receiver must have a deviation in relation to each other that does not exceed a certain value, so that the data can be received correctly.

To increase the possibilities of transferring asynchronous data between devices having rather inaccurate clock circuits and likely to have considerable clock drifts in relation to each other, data transmission protocols have recently been developed that enable a receiver to set its clock signal to that of a transmitter through the sending of a synchronization character by the latter. These protocols are, as a result, less demanding in terms of the receiver's clock signal deviation in relation to that of the transmitter. In the text below, local clock signal shall mean the receiver's clock signal, and reference clock signal shall mean the clock signal present in a synchronization character.

As an example, FIG. 1 represents an asynchronous frame according to the LIN protocol (Local Interconnect Network). This frame starts with a break character BRK comprising a string of 0 bits and ending with a last bit equal to 1 (extra bit). The string of 0 bits has a minimum length of 13 bits and is deemed to be detected when at least 11 0 bits are detected. The number of 11 bits is chosen conventionally and allows a deviation on the order of 15% to be tolerated between the local clock signal and the reference clock signal. The frame continues with a synchronization character SYNC followed by one or more data characters CH1, CH2, ... CHN. The first data character CH1 is commonly used as the identification field of the frame recipient.

However, in the LIN protocol as in other protocols, the transmission of an idle interval between two frames is not compulsory. It follows that the receiver may take considerable time to hot plug onto an asynchronous data bus since it must wait for the occurrence of this idle interval. Thus, it might not take into account data characters that were intended for it if they have been transmitted before it detects an idle interval.

SUMMARY OF THE INVENTION

An object of the present invention is to provide a synchronization device for a frame receiver that considerably shortens the time required to hot plug onto an asynchronous data bus.

This and other objects, advantages and features in accordance with the present invention are provided by an asynchronous frame receiver that receives a break character comprising a determined number of bits of the same value, and comprises means for hot-plugging onto an asynchronous data bus. The hot-plugging means may include means for detecting a break character. The asynchronous frame receiver may further comprise means for leaving an initial idle state when a break character has been detected, and may switch to at least one operating mode in which determined characters of an asynchronous frame can be detected by the frame receiver.

The receiver is intended to receive asynchronous frames containing a synchronization character after a break character, and includes means for activating a clock recovery circuit receiving the synchronization character at input after detecting a break character.

The clock recovery circuit may measure a clock period present in the synchronization character. The clock recovery circuit may measure a clock period from a first falling edge after a break character to a last falling edge of a synchronization character.

The means for detecting a break character may comprise a state machine.

The present invention also relates to an integrated circuit comprising an asynchronous frame receiver as described above. The present invention also relates to a microcontroller comprising an asynchronous frame receiver as described above.

The present invention also relates to a method for hot-plugging, onto an asynchronous data bus, an asynchronous frame receiver receiving a break character comprising a determined number of bits of the same value. The method comprises setting the frame receiver to an initial idle state, searching for the break character by the frame receiver, and when the break character is detected, switching the receiver to at least one operating mode in which determined characters of an asynchronous frame can be detected by the receiver.

The asynchronous frames may include a synchronization character after a break character, and the method may comprises a clock recovery step upon receiving a synchronization character. The clock recovery step may comprise measuring a clock period present in the synchronization character. A clock period is measured from a first falling edge after a break character to a last falling edge of a synchronization character. A break character may be detected by a state machine.

BRIEF DESCRIPTION OF THE DRAWINGS

These and other objects, features and advantages of the present invention shall be presented in greater detail in the following description of an example of an embodiment of a UART device according to the present invention, given in relation with, but not limited to, the following figures.

DETAILED DESCRIPTION OF THE PREFERRED EMBODIMENTS

As indicated above, a break character BRK comprises a string of N 0 bits, for example 13 0 bits in the LIN protocol that will be referred to below as a non-restrictive example. To take into account a frequency offset between this signal and the local clock signal, this character is detected by the identification of a string of 11 0 bits. As the number of 11 bits is defined conventionally to tolerate a clock deviation of ±15%, it is therefore susceptible to change.

The present invention provides an asynchronous frame receiver that becomes active upon detecting a break character BRK and which does not wait to detect an idle interval to hot plug onto an asynchronous data bus. An asynchronous frame receiver according to the present invention therefore comprises a character BRK detection device.

Figure 2:
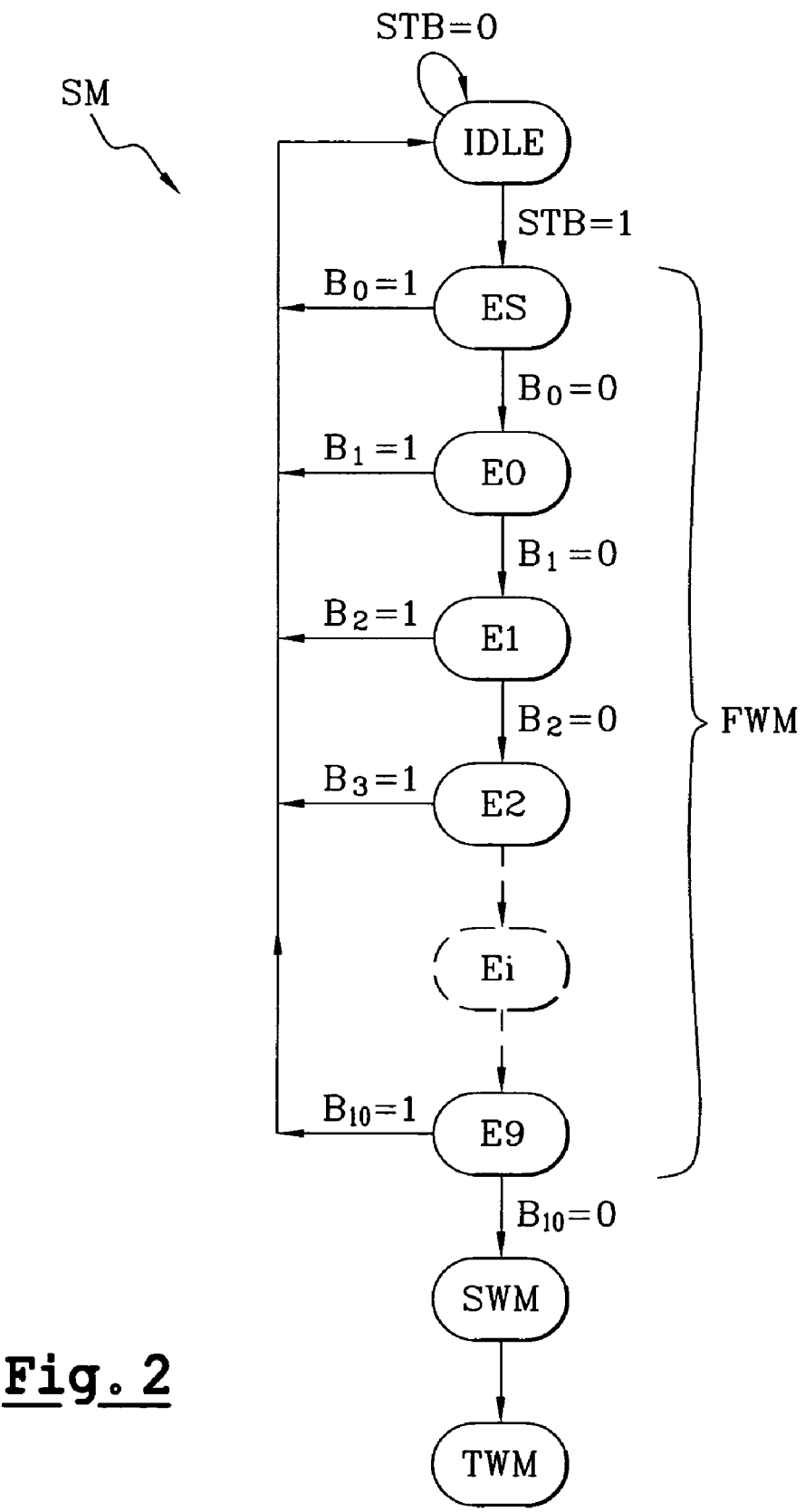
FIG. 2 represents a break character detection device according to the present invention.

The character BRK detection device may, for example, be a state machine SM, an example of which is shown in FIG. 2. The state machine SM comprises at least two operating modes FWM, SWM. The first operating mode FWM is a search for a character BRK mode. The second operating mode is a classic character read operating mode that is common to all UART circuits. This mode comprises the detection of a start bit, the detection of 8 data bits and the detection of a stop bit. States or steps provided in the FWM mode must be successfully passed to switch to the second operating mode SWM when hot plugging.

In one particular embodiment provided in relation with the LIN protocol, the operating mode SWM is a clock recovery mode intended to reset the local clock using the synchronization character that follows the character BRK. The operating mode SWM is then followed by a third operating mode TWM that is a classic character read operating mode common to all UART circuits, which comprises the detection of a start bit, the detection of 8 data bits and the detection of a stop bit.

The operating mode FWM of the state machine SM is represented in detail in FIG. 2. There is a first state IDLE that is an idle state or an awaiting frame state. The state machine SM only finally leaves the IDLE mode after detecting a valid character BRK.

Figure 1:
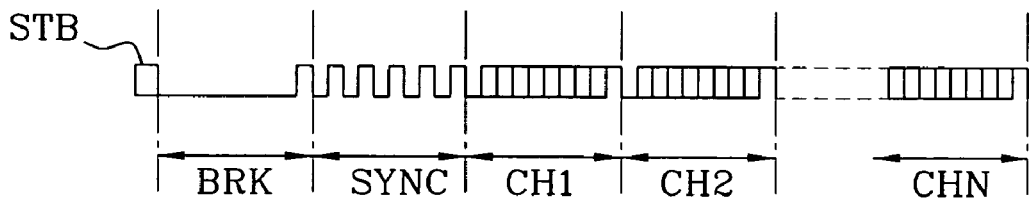
FIG. 1 represents an asynchronous frame based upon the LIN protocol according to the prior art.

The receipt of a 1 bit STB (bit STB preceding the character BRK, FIG. 1) triggers the change from the waiting state IDLE to an intermediary state ES. In the state ES, the receipt of a first 0 bit B0 triggers the change to an intermediary state E0, while the receipt of a first 1 bit B0 returns the state machine to state IDLE. The receipt of the next bit B1 depending on whether its value is 0 or 1, respectively causes the change to an intermediary state E1, or the return to the state IDLE. In the state E1, the receipt of the third bit B2, depending on whether its value is 0 or 1, respectively causes the change to an intermediary state E2, or the return to state IDLE.

Generally speaking, the receipt of the $(i+1)^{th}$ bit in the state Ei leads either to the state Ei+1 or to the state IDLE depending on whether the value of the bit received is 0 or 1, respectively.

When the value of the index i is 9, the receipt of the eleventh bit B10 after the bit STB, depending on whether the value of the bit B10 is 0 or 1, determines the change to the operating mode SWM or the return to the state IDLE. In one embodiment provided in relation with the LIN protocol, the change to the operating mode SWM activates a clock recovery circuit described below.

Figure 3:
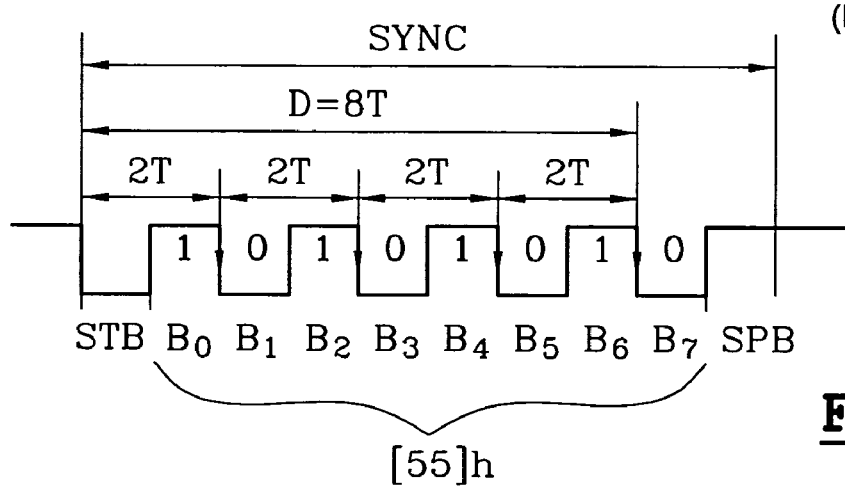
FIG. 3 represents a synchronization character according to the present invention.

It will be understood that the break character BRK can be detected in other ways, for example, by an 11-bit shift register all the bits of which are subject to a logic operation AND or even by a counter or any other appropriate way. The synchronization character SYNC according to the LIN protocol is represented in FIG. 3 and is equal to [55]h in hexadecimal notation, i.e., the character 10101010 in binary. This synchronization character is preceded by a 0 start bit STB and is followed by a 1 stop bit SPB.

As the synchronization character SYNC is preceded by a 0 start bit STB and followed by a 1 stop bit SPB, there are 5 falling edges in all to match a local clock signal to the reference clock signal of the SYNC character. As the duration D running between the 5 falling edges is equal to 8 times the period T of the reference clock signal, the measurement of this duration allows the period T of the reference clock signal to be deduced and that of the local clock signal to be matched to it.

Figure 4:
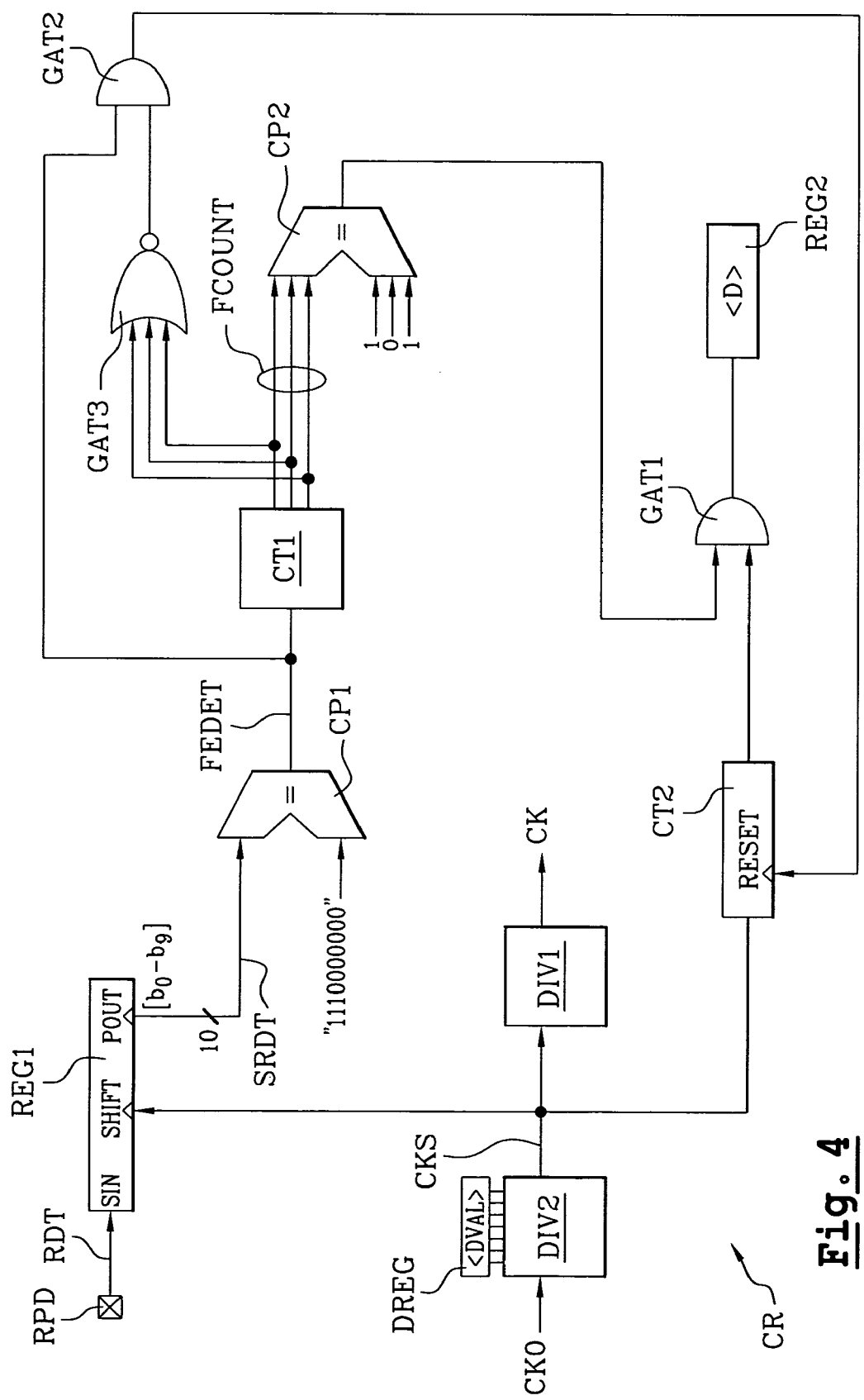
FIG. 4 represents a clock recovery circuit according to the present invention.

FIG. 4 is a schematic representation of a clock recovery circuit CR that allows a local clock signal CK to be synchronized with the clock signal conveyed by the synchronization character SYNC.

A local clock signal CK is delivered by a first divider DIV1, here a divider by 16, receiving a strobe CKS at input. The strobe CKS is itself delivered by a second programmable divider DIV2 receiving a primary clock signal CK0 at input. The ratio between the frequency of the signal CK0 and that of the strobe CKS is determined by a value DVAL loaded into a register DREG of the second divider DIV2.

The clock recovery circuit CR comprises, in addition, a receive register REG1, a transmit register REG2, two counters CT1, CT2, two logic comparators CP1, CP2, two AND type logic gates GAT1, GAT2 and a NOR type logic gate GAT3.

The receive register REG1 is a 10-bit shift register, the SHIFT input of which is paced by the strobe CKS. It receives data RDT at one serial input SIN connected to a data receive terminal RPD that is itself connected to an asynchronous data bus (not represented). It delivers sampled data SRDT (bits b0 to b9) to a parallel output POUT.

The sampled data SRDT are applied to one input of the first comparator CP1, the other input of which receives a reference number 1110000000, forming a falling edge detection criterion. This first comparator CP1 delivers a falling edge detection signal FEDET that is applied to the input of the first counter CT1.

The first counter CT1 delivers a falling edge count signal FCOUNT on 3 bits that is applied to one input of the second comparator CP2, the other input of which receives a reference number in binary form equal to 5. An output is connected to a first input of the first logic gate GAT1. The second counter CT2 counts the pulses of the strobe CKS. Its reset input is connected to the output of the second logic gate GAT2.

The logic gate GAT2 receives the presence signal FEDET at a first input and, at a second input the output signal of the third logic gate GAT3 that receives the 3 bits of the falling edge count signal FCOUNT at input. The value of the output signal of the third logic gate GAT3 is therefore 1 only if the value of the falling edge count signal FCOUNT is 0.

The first logic gate GAT1 has its second input connected to the output of the second counter CT2, and its output is connected to the transmit register REG2 that stores the number D of pulses of the strobe that occurred between the occurrence of the first and the fifth falling edge.

An external computing unit, for example the central processing unit of a microcontroller, determines the value DVAL that must be applied to the input of the second divider DIV2. This value is such that the period Ts of the strobe CKS must be equal to Ts=D/(8*16), where D is the duration measured between the five falling edges of the synchronization character SYNC, i.e., eight reference clock periods T. DVAL can be calculated by software or by any specific hard-wired logic circuit.

It should be noted here that the present invention applies regardless of the length of the synchronization character SYNC provided that the latter comprises an alternate string of 1s and 0s.

Figure 5:
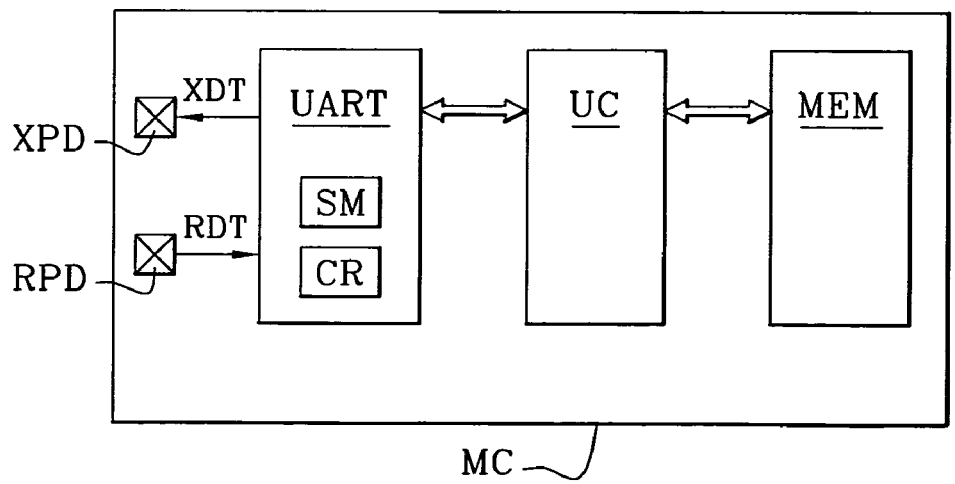
FIG. 5 represents a microcontroller comprising a UART circuit according to the present invention.

FIG. 5 shows one example of implementation of the present invention and is a schematic representation of a microcontroller MC comprising, on a single silicon chip, a central processing unit UC, a program memory MEM, and a UART circuit according to the present invention. The UART circuit comprises the state machine SM described above and the clock recovery circuit CR also described above. The UART circuit is connected to one input pad RPD of the integrated circuit to receive asynchronous data RDT, and to one output pad XDT to transmit asynchronous data XDT.

It will be clear to those skilled in the art that the present invention is susceptible to variations and embodiments. In particular, any step described can be replaced by an equivalent step without leaving the framework of the present invention.

That which is claimed is:

1. An asynchronous frame receiver comprising:
  an input for receiving an asynchronous frame comprising a break character, the break character comprising at least three bits, each and every bit of the break character having a same value; and
  a hot-plugging circuit for connecting to an asynchronous data bus that is operating, said hot-plugging circuit detecting the break character, and leaving an initial idle state and switching to at least one operating mode when the break character has been detected.

2. An asynchronous frame receiver according to claim 1, wherein the asynchronous frame further comprises a synchronization character after the break character, the asynchronous frame receiver further comprising:
  a clock recovery circuit that is activated after receiving the synchronization character at the input after detecting the break character.

3. An asynchronous frame receiver according to claim 2, wherein said clock recovery circuit measures a clock period in the synchronization character.

4. An asynchronous frame receiver according to claim 3, wherein said clock recovery circuit measures a clock period from a first falling edge after the break character to a last falling edge of the synchronization character.

5. An asynchronous frame receiver according to claim 1, wherein said hot-plugging circuit comprises a state machine.

6. An asynchronous frame receiver according to claim 1, further comprising a substrate; and wherein said hot-plugging circuit is on said substrate so that the asynchronous frame receiver comprises an integrated circuit.

7. A microcontroller comprising:
  a universal asynchronous frame receiver transceiver (UART) comprising an input for receiving an asynchronous frame comprising a break character, the break character comprising at least three bits, each and every bit of the break character having a same value; and
  a hot-plugging circuit for connecting to an asynchronous data bus that is operating, said hot-plugging circuit detecting the break character, and leaving an initial idle state and switching to at least one operating mode when the break character has been detected; and
  a processor connected to said asynchronous frame receiver.

8. A microcontroller according to claim 7, further comprising a memory connected to said processor.

9. A microcontroller according to claim 7, wherein the asynchronous frame further comprises a synchronization character after the break character, said UART further comprising:
  a clock recovery circuit that is activated after receiving the synchronization character at the input after detecting the break character.

10. A microcontroller according to claim 9, wherein said clock recovery circuit measures a clock period in the synchronization character.

11. A microcontroller according to claim 10, wherein said clock recovery circuit measures a clock period from a first falling edge after the break character to a last falling edge of the synchronization character.

12. A microcontroller according to claim 7, wherein said hot-plugging circuit comprises a state machine.

13. A method for connecting an asynchronous frame receiver to an asynchronous data bus that is operating, the method comprising:
  setting the asynchronous frame receiver to an initial idle state;
  receiving at an input of the asynchronous frame receiver an asynchronous frame comprising a break character, the break character comprising at least three bits, each and every bit of the break character having a same value; and
  detecting the break character and switching the asynchronous frame receiver from the initial idle state to at least one operating mode.

14. A method according to claim 13, wherein the at least one operating mode comprises a read mode.

15. A method according to claim 13, wherein the asynchronous frame further comprises a synchronization character after the break character; and further comprising activating a clock recovery circuit after receiving the synchronization character at the input after detecting the break character.

16. A method according to claim 15, wherein the clock recovery circuit measures a clock period in the synchronization character.

17. A method according to claim 16, wherein the clock recovery circuit measures a clock period from a first falling edge after the break character to a last falling edge of the synchronization character.

* * * * *